(12) United States Patent
Zimmer et al.

(10) Patent No.: US 8,464,494 B2
(45) Date of Patent: *Jun. 18, 2013

(54) ANCHOR WITH A MULTI-CHAMBER CEMENT CONTAINER

(76) Inventors: Günther Zimmer, Rheinau (DE);
Martin Zimmer, Rheinau (DE);
Rüdiger Walz, Neustetten (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/065,400

(22) Filed: Mar. 21, 2011

(65) Prior Publication Data

US 2011/0232224 A1     Sep. 29, 2011

Related U.S. Application Data

(63) Continuation-in-part of application No. PCT/DE2009/001303, filed on Sep. 21, 2009.

(30) Foreign Application Priority Data

Sep. 22, 2008  (DE) .................... 10 2008 048 354

(51) Int. Cl.
*E04B 1/38*    (2006.01)
*E04C 5/00*    (2006.01)

(52) U.S. Cl.
USPC ............. 52/701; 52/364; 52/705; 52/707; 411/32; 411/45; 411/82.3

(58) Field of Classification Search
USPC ............ 52/125.3, 125.4, 125.5, 704, 705, 52/701, 707, 711, 698, 699, 364; 411/82, 411/82.3, 32, 45, 46, 49; 405/259.4, 259.5
See application file for complete search history.

(56) References Cited

U.S. PATENT DOCUMENTS

| | | | | |
|---|---|---|---|---|
| 3,042,156 A * | 7/1962 | Rohe | ...................... | 52/787.12 |
| 4,208,133 A | 6/1980 | Korte-Jungermann | | |
| 4,428,705 A * | 1/1984 | Gelhard | ...................... | 411/82.1 |
| 4,509,308 A * | 4/1985 | Dettfurth et al. | ............ | 52/787.1 |
| 4,679,966 A * | 7/1987 | Yacisin | ...................... | 405/259.6 |
| 7,413,367 B2 * | 8/2008 | Hawang | ...................... | 403/297 |
| 8,046,964 B2 * | 11/2011 | Zimmer et al. | ................ | 52/364 |
| 2005/0123372 A1 * | 6/2005 | Sato | ................... | 411/32 |
| 2010/0115882 A1 * | 5/2010 | Seroiszka et al. | ............ | 52/787.1 |
| 2010/0287875 A1 * | 11/2010 | Zimmer et al. | ................ | 52/699 |
| 2011/0027037 A1 * | 2/2011 | Zimmer et al. | ................ | 411/82 |
| 2011/0232223 A1 * | 9/2011 | Zimmer et al. | ................ | 52/699 |

FOREIGN PATENT DOCUMENTS

GB   2 080 906   2/1982

\* cited by examiner

*Primary Examiner* — Brian Glessner
*Assistant Examiner* — Brian D Mattei
(74) *Attorney, Agent, or Firm* — Klaus J. Bach

(57) ABSTRACT

In an anchor for use in a construction panel which includes upper and lower cover plates, wherein the anchor includes a cylinder body, a displacement body and a cement container provided with desired rupture locations and installed in the cylinder body and the cylinder body is provided with engagement elements for extending behind the upper cover plate, the cement container includes at least two chambers separated by an intermediate wall and is provided with an upper and a lower opening each closed by a thin-walled rupturable foil, with the intermediate wall being also rupturable by the displacement member upon movement thereof into the cylinder body.

10 Claims, 6 Drawing Sheets

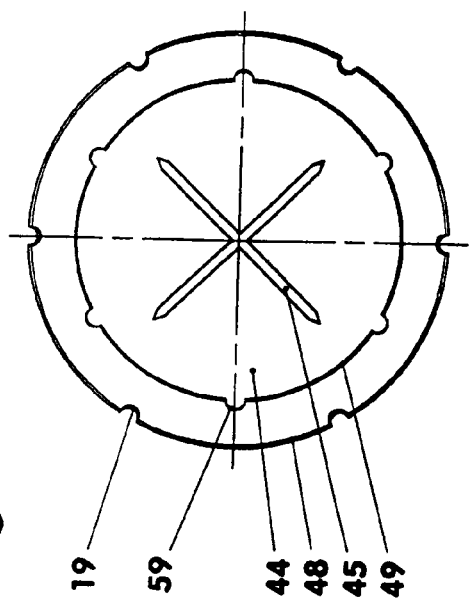
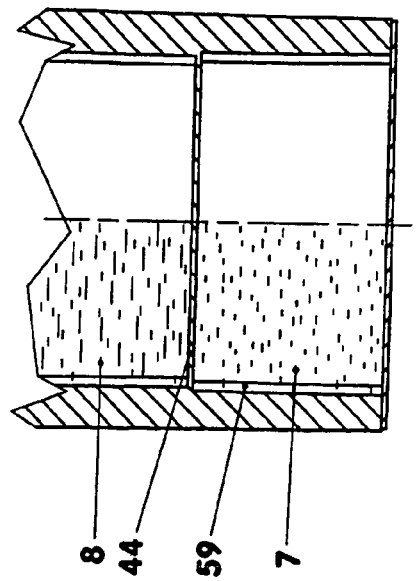
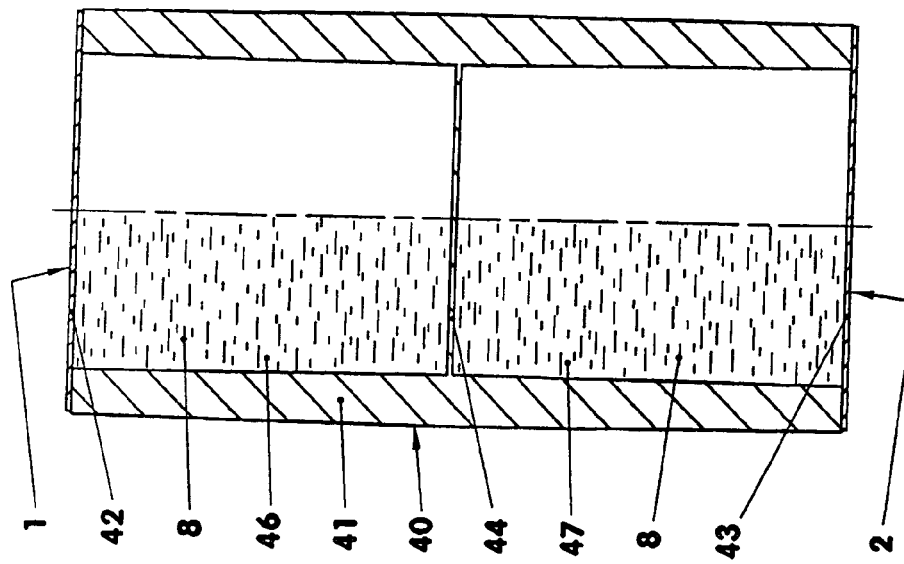

ANCHOR WITH A MULTI-CHAMBER CEMENT CONTAINER

This is a Continuation In Part application of pending international patent application PCT/DE2009/001303 filed Sep. 21, 2009 and claiming the priority of German patent application 10 2008 048 354.0 filed Sep. 22, 2008.

BACKGROUND OF THE INVENTION

The invention resides in an anchor for use in connection with a lightweight construction panel including an upper and a lower cover plate. The anchor comprises a hollow cylindrical body with a bottom wall and a displacement body and a cement container provided with rupture areas. The cylindrical body includes at least two engagement elements which, upon insertion of the anchor into a bore of the lightweight construction panel and the displacement body into the cylindrical body, are spread apart behind the upper cover plate of the light-weight construction panel. The cement container is disposed in an inner space of the cylindrical body which is provided with several openings.

The lightweight construction panels which are often also called sandwich plates or honeycomb plates as used in the field of furniture construction, have generally rigid cover layers of thin particle boards, medium- or high-density fiber plates, plywood or hard fiber plates: The sandwich plates include herein as center layer or, respectively, support layer for example polyurethane foam or polystyrol. In honeycomb panels as intermediate layers often corrugated web inserts or so-called expander honeycomb inserts are used. Most lightweight construction panels have a density of below 500 kg/m³. If as intermediate layer no fire-resistant aluminum foams or foamed glass is used, the density is below 350 kg/m³. For comparison, the density of a non-layered particle board is about 600-750 kg/m³.

If armatures have to be attached to lightweight construction panels for example by means of screws, the problem occurs that the mounting means are engaged only with the relatively thin upper cover layer or, respectively, plate.

DE 10 2008 010 730 A1 discloses an anchor which consists of at least two parts and in which at least two relatively large anchor parts are inserted into one another during anchor assembly. An at least partially pot-shaped component herein has the function of a cylinder whereas a pin-like component has the function of a piston. At the bottom of the pot-like component, a cement cartridge is disposed which ruptures open when the two mentioned anchor components are moved together.

It is the principal object of the present invention to provide a cement anchor for lightweight construction panels which is easy to install but is firmly, safely and durably retained in the lightweight construction panel.

SUMMARY OF THE INVENTION

In an anchor for use in a construction panel which includes upper and lower cover plates, wherein the anchor includes a cylinder body, a displacement body and a cement container provided with desired rupture locations and installed in the cylinder body and the cylinder body is provided with engagement elements for extending behind the upper cover plate, the cement container includes at least two chambers separated by an intermediate wall and is provided with an upper and a lower opening each closed by a thin-walled rupturable foil, with the intermediate wall being also rupturable by the displacement member upon movement thereof into the cylinder body.

With the present invention, a so-called hydraulic cement anchor is provided which is in the form of a cylinder piston unit. In the form in which the anchor is commercially available, the cylinder is filled with a flowable cement stored in a multi-chamber container. When now the cement anchor is inserted into a bore of a lightweight construction panel and the displacement body is moved into the cylinder, first the upper chamber of the cement container is pushed open by the displacement body. The displacement body entering the upper chamber displaces the cement in a direction opposite to the direction of movement of the displacement body into the area below the upper cover plate. With further inward movement of the displacement body, the cement container is pressed against the cylinder bottom whereby the lower chamber of the cement container is ripped open at the bottom thereof. The displacement body now pushes the rest of the cement through the openings in the lower cylinder area into the area around the lower end of the anchor. With the forward movement of the displacement body, the remaining flowable cement is directed, via bores or channels, to areas where it is needed for holding the anchor in the lightweight construction panel. After telescopic compression of the cylinder body and the displacement body, the cement hardens and durably fixes the anchor in the lightweight construction panel.

Into this unit which consists of for example a tough elastic plastic material, a screw may be screwed already during the cement hardening period.

The invention will become more readily apparent from the following description of a particular embodiment thereof with reference to the accompanying drawings.

BRIEF DESCRIPTION OF THE DRAWINGS

FIG. 17 shows a multi-chamber cement container with a central dividing wall in an enlarged representation, FIG. 18 shows a multi-chamber cement container with a dividing wall arranged off-center, and FIG. 19 is a bottom view of FIG. 18 showing grooves in the container wall and in the intermediate dividing wall.

DESCRIPTION OF PARTICULAR EMBODIMENTS

Figure 1:
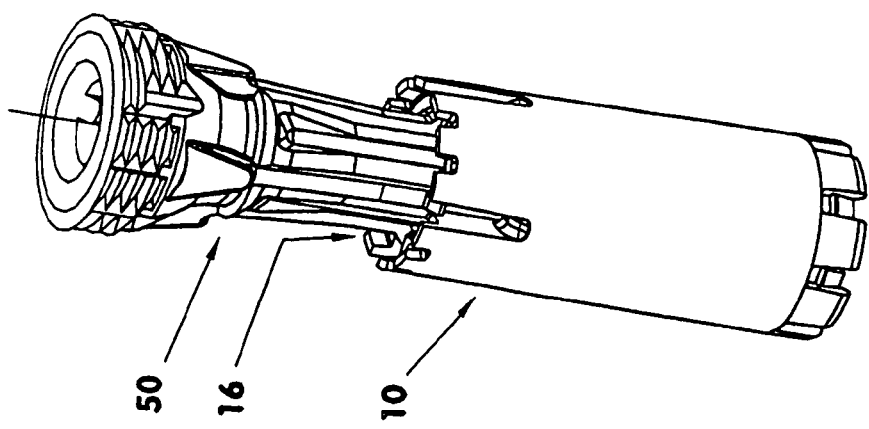
FIG. 1 is a perspective view of the anchor in the form in which it is commercially available.
Figure 2:
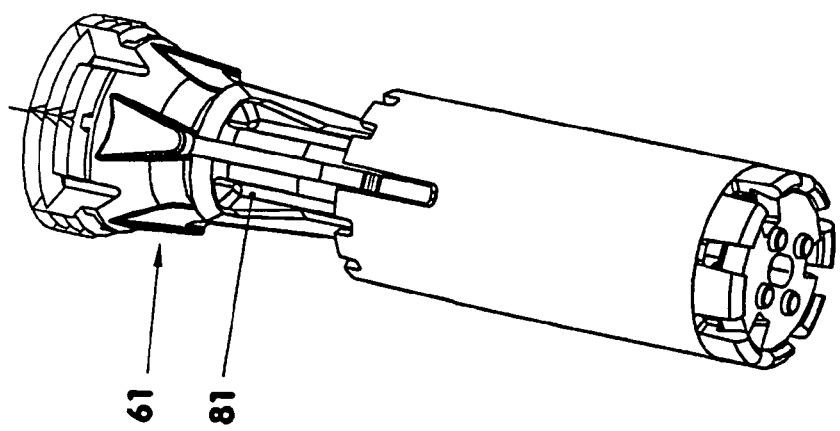
FIG. 2 is the same as FIG. 1 showing the anchor at an angle from below.
Figure 3:
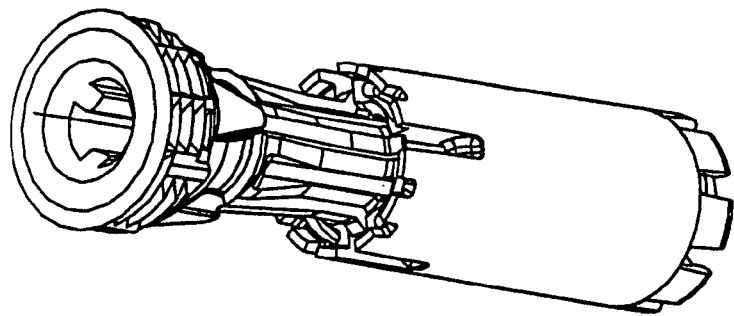
FIG. 3 is the same as FIG. 1 showing the anchor at an angle from above.

FIGS. 1 to 3 show an anchor in three views. The anchor is shown in the form in which it is commercially available. It comprises a cylinder 10 with a displacement body 50 partially inserted into the cylinder 10. Between the displacement body 50 and the cylinder body 10 a cement container 40, here a cement cartridge, see FIG. 11, is enclosed.

Figure 11:
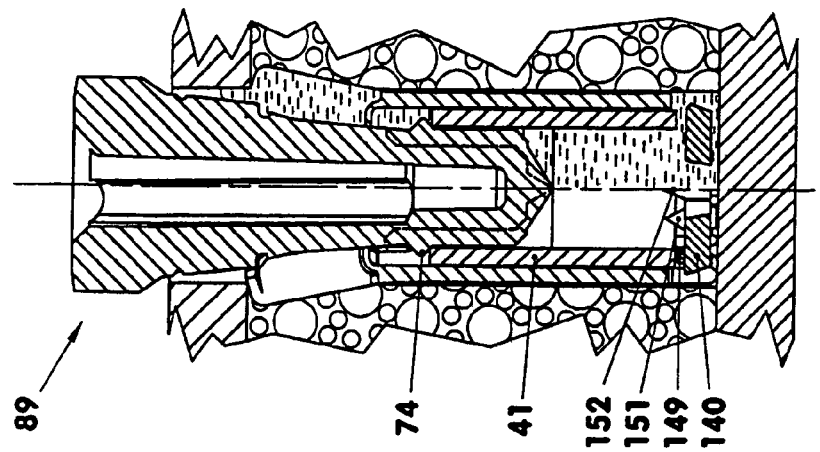
FIG. 11 is an axial cross-sectional view of the anchor.

FIG. 11 shows the anchor of FIGS. 1 to 3—slightly modified—in a longitudinal cross-sectional view. Its cylinder body 10 is shown herein disposed in a lightweight construction panel without lock and rigid inserts.

Figure 16:
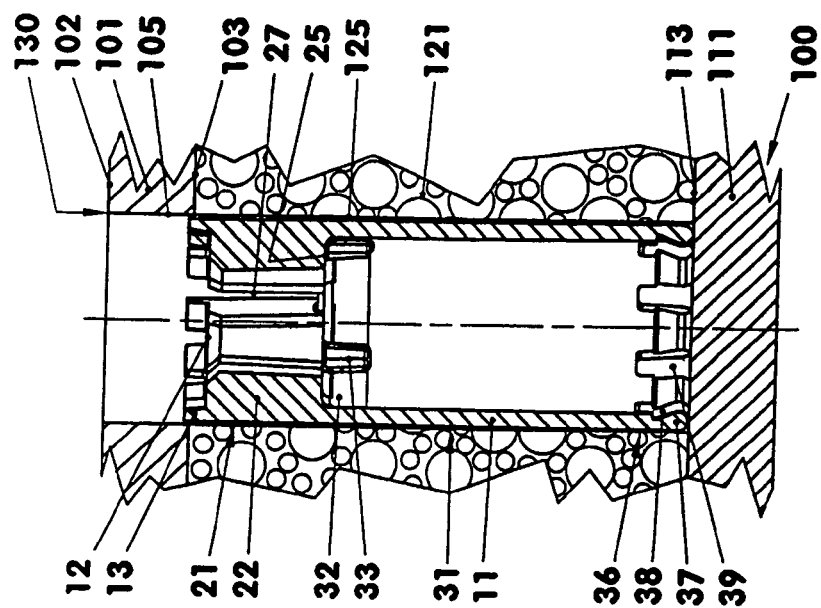
FIG. 16 is a longitudinal cross-sectional view taken through a bore in the lightweight construction panel with a cylinder body inserted.

The lightweight construction panel 100 as shown in FIG. 16 comprises two cover plates 101 and 111 with a support core 121 disposed therebetween. In the exemplary embodiment, each cover plate 101, 111 comprises a thin particle board. The support core 121 is in this case for example a PV foam core. The cover plates 101, 111 are at their inner surfaces glued to the support core. The lightweight construction panel has a wall thickness of 20 to 40 mm. Each cover plate has a thickness of for example of 2 to 8 mm. Instead of the foam core, among others a honeycomb core may be provided. The lightweight construction panel 100 includes a bore 130 including sections 105 and 125.

The lightweight construction panel 100 may also be curved for example cylindrically or spherically as long as the material thickness of the support core 121 remains at least approximately constant.

For installing the cement anchor, a bore is drilled through, or respectively into, the first cover plate 101 and the support core 121. As boring tool for example a spiral drill with a tip angle of 180° is used. If expedient, also a spot facer can be used. Depending on the type of anchor also a step facer may be used. The cavity or respectively bore formed thereby is blown out by compressed air or it is suctioned out.

The cylinder body 10 is, when assembled, a pot-like component which consists of a tubular section (11) and a bottom 140. In the shown embodiment, the bottom 140 is engaged in the tube section 11.

Figure 6:
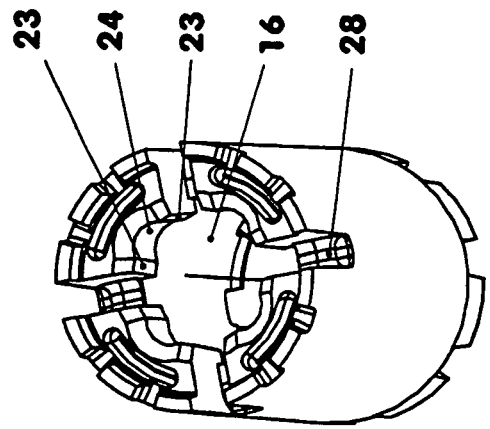
FIG. 6 is the same as FIG. 4 showing the sleeve at an angle from above.
Figure 4:
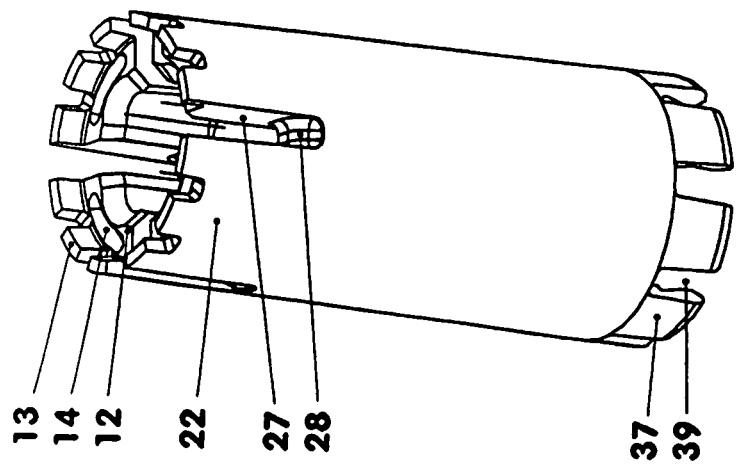
FIG. 4 is a perspective view of the anchor sleeve.
Figure 9:
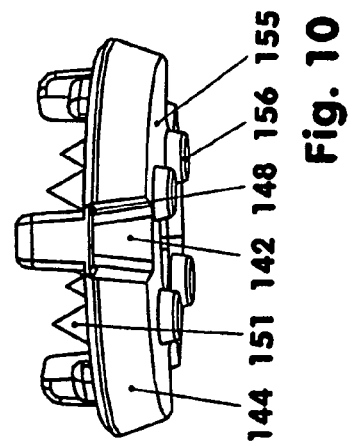
FIG. 9 is a perspective view of the bottom of the anchor.

The tube section 11 as shown in FIG. 16 consists for example of a plastic material such as ABS and has an at least approximately cylindrical outer wall. It becomes smaller by several tenths of angular degrees toward the top. The tube section 11 comprises three larger areas. The first area is the engagement area 21. In the shown embodiment, it has for example four straight longitudinal slots 27, see FIGS. 4 and 6. The longitudinal slots 27 separate for example four equally-sized engagement elements 22.

Each engagement element (22) consists primarily of a block of a trapezoidal, longitudinal cross-section, see FIG. 16, which is connected to the second area (31) of the tube section (11) by a narrow thin-walled hinge zone (32). The inner wall structures of the individual engagement elements (22) comprises two support areas (23) and a channel (247) disposed therebetween, see FIG. 6. The support areas (23) are partial surface areas of a truncated cone envelope whose cone angle is about 4°. The theoretical tip of the cone is disposed according to FIG. 16 far above the upper front face (12) of the tubular section (11). The average diameter of the truncated cone envelope in the area of the support surfaces (23) corresponds for example to half the maximum outer diameter of the tubular section (11).

The channels (24) disposed between the support surfaces (23) have a curvature radius of about 1 mm. The depth of the channels (24) as measured with respect to the theoretical truncated cone envelope of the support surfaces (23) is for example 0.3 to 0.4 mm.

The engagement elements (22) are provided at the front faces (12) with a structure which has upwardly projecting pinnacles (13) and crimp-like recesses (14). The three pinnacles (13) of each engagement element (22) are co-extensive with the outer wall. They have an average wall thickness of about 0.5 mm. Behind each of the center pinnacles (13), there is a recess (14). The length of the recess (14) is about twice the length of a pinnacle (13). The purpose of the recesses (14) is to facilitate bending over inwardly of the pinnacle (13).

Figure 12:
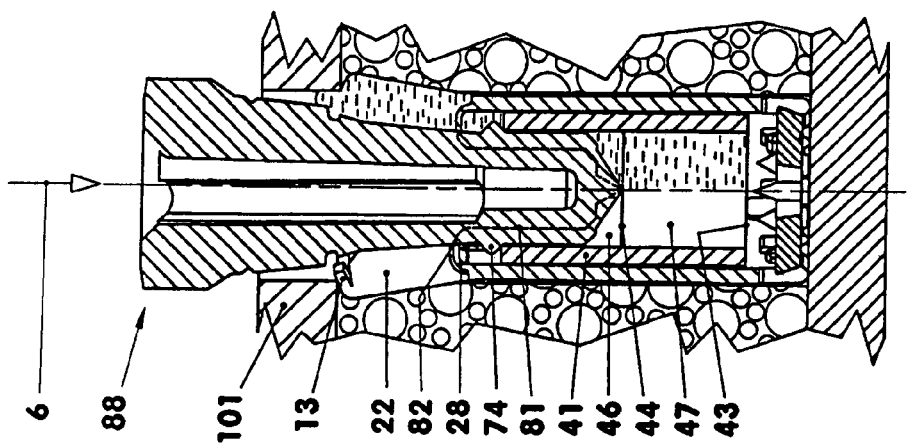
FIG. 12 is the same as FIG. 11 after a first displacement body insertion step.
Figure 13:
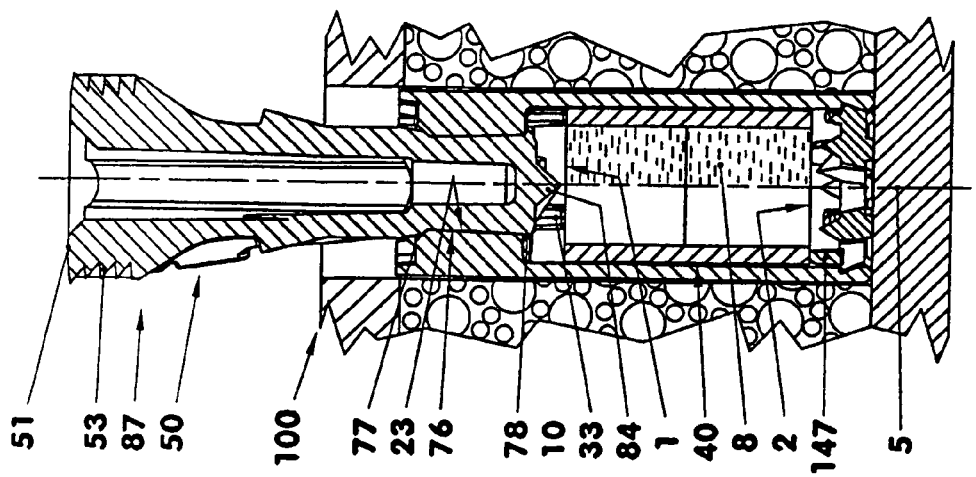
FIG. 13 shows the same as FIG. 12 after a second displacement body insertion step.

The lower end of the individual longitudinal slots (27) is shaped in a particular way as shown in FIG. 12. There is a narrow elastic sealing tongue (28) about 0.3 mm thick, extending from the lower end, which tongue is bent inwardly by 90 angular degrees and extends inwardly at least essentially horizontally by about 1 mm into the interior space (17).

Between the front face (12) and the support surface (23) as well as the channels (24), there is for example a 0.6×45° chamfer on part of which the displacement body (50) abuts with its blocking areas (77).

The second area (31) of the tubular section (11) is the cartridge support area. This area (31) has an at least approximately cylindrical inner wall which becomes slightly narrower toward the bottom, see FIG. 16. The wall has there an average thickness of for example 0.8 mm.

In the area of the hinge zone (32) four at least approximately squared stops (33) are provided which project from the inner wall inwardly by about 0.5 mm. They are arranged between the longitudinal slots 27. The cement containers 40 abuts the lower edges of the slots, see FIG. 11.

Figure 5:
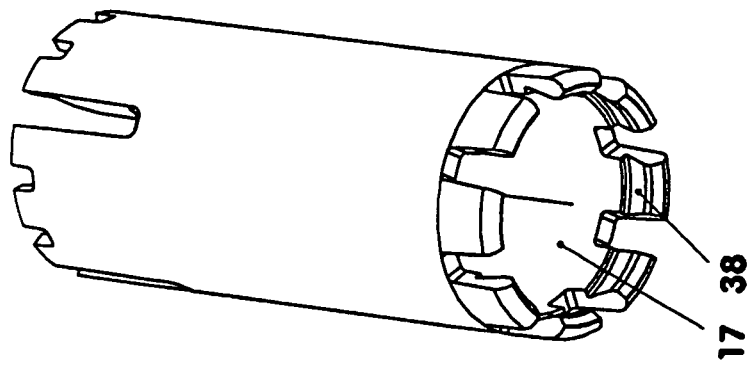
FIG. 5 is the same as FIG. 4 showing the sleeve at an angle from below.

The third area 36 of the tubular sections 11 is the bottom stop area. It consists of for example eight downwardly projecting elastic tongues 37, see also FIGS. 4 and 5, which are separated from one another by longitudinal slots 39. On the inner walls of the tongues 37, that is, on the lower two thirds of the tongues, there is an annular recess 38 whose enveloping surface area corresponds to a truncated cone sleeve. The truncated cone sleeve has a cone angle of 40°. The theoretical tip of the truncated cone envelope is below the lower cover plate 111. The annular recess 28 serves as seat for the cylinder bottom 140, see FIGS. 11 to 15.

The cylinder bottom 140, which consists for example of ABS, is essentially a disc with a largely truncated cone-like outer wall 141. It has a central oval opening 143. At its bottom, it is provided with four truncated cone-shaped legs 156 which each have a length of about 0.4 mm.

At its upper side 144, the bottom 140 is provided with three large break-off pins 147, three kidney-shaped support legs 149, four pointed thorns 151 and two sharp-edged horizontally extending prisms 152.

The individual at least approximately squared break-off pins 147 are disposed at the circumferential edge of the bottom 140. They are formed onto the bottom 140 by way of two break-off webs 148 within trapezoidal recesses 142. The break-off pins 147 project about 1.5 mm upwardly over the upper side 144. The break-off webs 148 have a wall thickness of 0.1 mm.

The three kidney-shaped support legs 149 have a height of 0.5 mm. They are disposed at the edge area of the bottom 140 between break-off pins 147. The cone-shaped thorns 151 have a height of 1 mm and a tip angle of 60°. They are arranged at the corners of a square, which includes the oval opening 143. Adjacent the longitudinal sides of this opening 143, there is in each case a prism 152. The respective tip of each individual prisms 152 is disposed about 1.2 mm above the upper side 144.

The cement cartridge 40 is essentially a cylindrical tube 41, which at each of its ends has an opening 1, 2 that is closed by a cover foil 42, 43, see FIGS. 17, 18. As shown in FIG. 17, the cement cartridge 40 is divided at its center by an intermediate wall 44 whereby two cement chambers 46, 47 are formed. The cover foils 42, 43 and the intermediate wall 44 extend normal to the center line 5. As shown in FIGS. 17 and 18 the intermediate wall 44 is formed from the same material as the cement container 40. The cover foils 42, 43 are PE-coated aluminum foils. Altogether, each aluminum foil 42, 43 forms a desired rupture location. Expediently, it may also have special perforations or notches which form thin wall areas of little rupture resistance. In FIG. 19 for example, a notch-like, for example cross- or x-shaped thin area 45 is shown for the intermediate wall area 44. The weakening of the intermediate wall area 44 in this case is provided by an about 50 percent thickness reduction in the wall area of the intermediate wall 44.

The cover foils 42, 43 and the intermediate wall 44 have a wall thickness of for example 0.01 to 0.2 mm. Their rupture resistance is in each case below 10 N/mm². If in connection with the cover foils 42, 43 and the intermediate wall 44 additional perforations or thinned-wall areas are used, then the rupture resistance is so selected that the displacement body 50 can pierce the parts 42-44 without problems.

The tube 41 consists of PE-HD, for example Hostalen® GC7260, which is a material to which the cement used does not adhere well and whose water absorption is below 1%. It has for example an outer diameter of 8 mm and a wall thickness of for example 0.9 mm. Each chamber is filled with about 0.15 to 0.3 ml cement 8.

As shown in FIG. 17, the at least approximately cylindrical outer and inner walls 48, 49 become smaller in diameter from the intermediate wall toward the openings 1, 2. As "at least approximately cylindrical", an angular deviation of the wall of up to three degrees is tolerated. As shown in FIGS. 18 and 19, the walls 48, 49 have each for example six grooves 19 and 59. The grooves 19, 59 prevent after the anchor installation a relative rotation of the displacement body 50 and the cylinder body 10 within the tube 41 while the cement 19 is not yet fully cured. The cured cement, 9 provides for form-locking engagement.

With the intermediate wall 44, the cement 8 can be distributed selectively in the areas adjacent the upper and the lower cover plates 101, 111. If the cement 18 is to be distributed asymmetrically, the intermediate wall 44 may be arranged correspondingly displaced, see FIG. 18.

The cement is for example a single-component moisture-hardening reaction cement on the basis of polyurethane. Here, the cement hardens under the influence of moisture with some foam formation, to become a water resistant tough cement film. The curing time is at a room temperature of 20° C. about five to fifteen minutes. The viscosity is 7000±2000 mPA*s.

Alternatively, the cement container 40 may contain a moisture hardening one-component reaction cement on isocyanate basis.

Expediently, short plastic material fibers are mixed into the cement. The plastic material fibers are all shorter than one millimeter. They have a diameter of about 40 micrometer. The volume content of plastic material fibers is at least 15 percent.

It is also possible to fill the lower chamber 47 not with a cement 8 but with a wood solidifier 7, for example, a moisture interlinking one-component compound on polyurethane basis.

In this case, the wood solidifier is distributed on the inner surface 113, of the lower cover plate 111. It flows out of the chamber 47 still before the intermediate wall 44 is ruptured by the displacement body 50. The wood solidifier or, respectively, the wood densifier is a low viscosity liquid with high depth effect. It penetrates into the upper layers of the lower cover plate 111 which consists of wood or a wood fiber material. In the process, it increases the basic strength of the cover plate 111 to at least twice the original strength.

Alternatively, the lower chamber 47 may also contain a wood sealer on polyurethane basis.

The one-part displacement body 50 which may consist for example of the plastic material ABS is provided at its outside with four zones, an upper clamping zone 52, a wedging zone 61, a reflux zone 65 and a lower holding zone 75. A central opening 85 extends through the upper three zones and ends in the lower holding zone.

The upper clamping zone 52 which, after installation of the anchor, is disposed in the bore 105 engaged in the upper cover plate 101, has an at least approximately cylindrical shape. The outer wall is highly structured. It is provided for example with four circumferentially extending grooves 54 disposed between five at least partially closed circumferentially extending webs 53, which are interrupted by for example twelve circumferentially equidistantly distributed vertical clamping webs 55. Next to each third clamping web 55, there is a vertical groove 56 which interrupts the two lower circumferential webs 53. The grooves 56 are about 30% deeper than the circumferential grooves 53. The grooves 56 extend to the adjacent wedging zone 61.

As seen from the top, see FIG. 11, the second to fifth circumferentially extending webs 53 have a diameter which is smaller by 0.3 mm than the uppermost circumferentially extending web 53. The diameter of the first circumferential web is 0.8 mm larger than the diameter of the bore 105. In addition, the first circumferentially extending web 53 is chamfered at the front face 51 thereof so that its upper edge is disposed about 0.15 mm lower than the plane of the upper front face 51.

In the area of the wedging zone 61, the displacement body 50 becomes narrower by about 44% of its outer diameter. The cone angle is about 64°. On the frustroconical surface of the wedging zone 61 four wedge elements 62 are provided which are equidistantly distributed around the wedging zone 61. The wedge elements 62 which are pointed downwardly have a planar surface 63 and are inclined with respect to the center line 5 by for example 6° so that the respective tips of the wedge elements 62 have the shortest distance from the center line 5.

Figure 8:
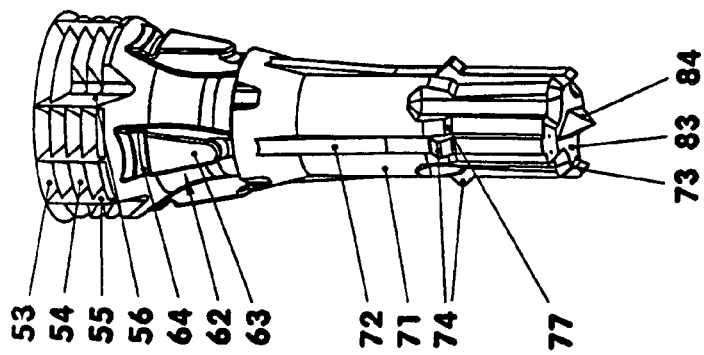
FIG. 8 is the same as FIG. 7 showing the displacement body at an angle from below.
Figure 7:
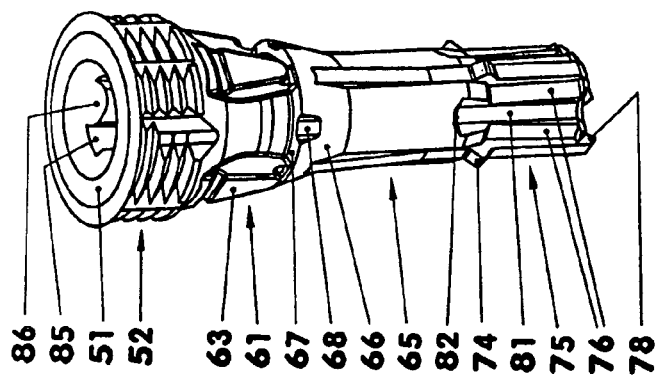
FIG. 7 is a perspective view of the displacement body.

Upon installation of the anchor, the wedge elements 62 are disposed in the spread apart longitudinal slots 27 between the engagement elements 22, wherein the lower tips of the wedge elements 62 are disposed at the base of the v-shaped longitudinal slots 27. The side flanks of the engagement elements 22 are then in contact with the side walls of the slots thereby preventing relative rotation. Each surface area 63 has, as shown in FIGS. 7 and 8, additionally a horizontal groove 64 whose groove area is in the form of a part of a toroid. The respective groove 64 supports the form-locking engagement of the cement 9 which has flowed below the upper cover plate 103 and has hardened there.

Below the wedge zone 61, there is the reflux zone 65. The center area of the reflux zone 65 is formed by a cylindrical section 71 on which four rotation preventing webs 72 are arranged evenly spaced around the circumference. The rotation preventing webs 72 start at the tips of the wedge elements 62, see FIGS. 1 to 3, 8, and end at the lower front face 83 of the displacement body 50, see FIGS. 7 and 8. In the area of the cylindrical section 71, the outer wall of the individual rotation-preventing webs 72 form a wedge area which extends at an angle of about 4 degrees with respect to the center line 5.

As shown in FIGS. 7 and 8, a truncated cone-shaped locking ring 66 is formed at the transition of the zones 61 and 65, the upper area of which bridges the rotation preventing webs 72. The locking ring 66 has a cone angle of 30°. The theoretical tip of the truncated cone is disposed on the centerline 5 in the area of the holding zone 75. Toward the wedge elements 62 has an also frustroconical surface 67. Its cone angle is for example 150°, wherein the imaginary cone tip is disposed in the wedging zone 61.

The blocking ring 66 has four short channel-like cutouts 68 for accommodating the stop 33 of the tube section 11 during assembly, possibly in a form-fitting manner.

The lowermost area of the displacement body 50 is the holding zone 75. Within this zone, the rotation preventing webs 72 extend downwardly. There, they have planar surfaces which extend parallel to the center line 5 and partially project beyond the lower front face 83 and end in cutting edge-like tips 73. The diagonally opposite outer surface areas are spaced by a distance which is slightly smaller than the inner diameter of the tube 41 of the cement cartridge 40. At the transition between the reflux zone 65 and the holding zone 75, each rotation-preventing web 72 is provided with an outwardly extending support projection 74, see also FIGS. 12 and 23. The support projection has a front and a rear flank. Both flanks extend at a right angle wherein the plane of the front flank intersects the centerline 5 at an angle of 45°. The maximum distance between two oppositely disposed support projections is about 0.8 mm greater than the inner diameter of the tube 41, see FIG. 12.

Between the rotation-preventing webs 72 the holding surface areas 76 are disposed. Their outer surface area has the shape of a truncated cone envelope, which has a tip angle of for example 4° and whose imaginary tip is disposed above the upper front face 51. As shown in FIG. 11, the holding surface areas 76 of the displacement body 5 are in contact with the support surfaces 23 of the cylinder body 10. At the upper ends of the holding surface areas 76, there are the blocking areas 77. They too are part of a truncated cone envelope which has a tip angle of for example 90° wherein the imaginary tip is disposed in the area of the holding zone 75.

At the lower ends of the holding surface areas 76, there are support projections 78 projecting radially outwardly by 0.3 mm which, in accordance with FIG. 11 extend around the engagement surfaces 25 of the engagement elements 22.

In the center of each holding surface 76, there is a return flow channel 81. Each of the four return flow channels 81 extends from the lower front face 83 up to the lower area of the reflux zone 65, see also the dashed line.

The base of the return flow channels 81 extends parallel to the centerline 5. In FIGS. 1-3, the return channels 81 end only shortly ahead of the wedging zone 61.

At the lower front face 83, a pyramidal tip 84 is arranged for rupturing the upper cover foil 42, see FIG. 8. The base of the tip 84 has a rhombus shaped area whose long diagonal is 2.7 times the length of the short diagonal. The long diagonal is 4.2 mm, the height of the pyramidal tip 84 is for example 1.1 mm.

In the upper front face 51, a central, at least partially truncated cone-shaped, opening 85 is provided whose centerline has three or more radially inwardly extending webs 86 which end shortly ahead of the holding zone 75. Between the front face 51 and the opening 85, there is a 0.9×45° chamfer.

The opening 85 has, in its upper area, not considering the webs 86, for example a diameter of 4.2 mm. The inner circle formed there between the webs 85 has a diameter of about 2 to 3 mm, wherein the webs 86 have at their tops a width of about 2.3 mm. The front edges of the webs 86, which border the inner circle, extend also parallel to the center line 5.

The mounting elements are for example particle board screws of the sizes, given in millimeters, 3.5×25 or 4×25.

The opening 85 may of course have also almost any other cross-section that is it may be oval, polygonal, multi-cornered, or star-shaped or have any other form. The opening may also have the form of a short straight cone. In this case, the mounting element must itself generate the largest part of the support bore.

In the exemplary embodiment, the cavity is to guide the mounting element so that it does not move away from the centerline 5 when being screwed in. However, the cavity may also be omitted or it may be replaced by a point mark.

For holding the cement anchor in the bore 130 of the lightweight construction panel 100, the anchor is generally inserted in a single stroke. With the spreading apart of the engagement elements 22 and the shape of the clamping zone 52, the anchor is firmly held in position in the bore 13 already before the curing of the cement 8.

In the following text, the fixing of the anchor will be described in individual separate steps although the procedure is performed in a single continuous insertion stroke. In FIGS. 11 to 15, the cement 8, 9 or respectively, the cement flow is shown only in the right hand figure side in order to show the design details at the other side.

FIG. 11 shows an anchor as it is available commercially which has been inserted in a first step into a prepared bore 125 formed into the lightweight construction panel 100. The cylinder body 10 is disposed on the inner surface 113 of the lower cover plate 111. The upper front face 12 of the cylinder body 10 is disposed herein for example 0.5 mm below the inner surface 103 of the upper cover plate 101. In the cylinder 10, the still closed cement cartridge 40 is disposed. Above the cement cartridge 40, the displacement body 50 is arranged above its holding zone 75 in the engagement area 21 of the cylinder body in its first position 87. Its pyramidal tip 84 is not in contact with the cement cartridge 40.

In a second step, the displacement body 50 is moved into the cylinder body 10 in the anchor installation direction 6 until the support projections 74 are disposed on the upper rim of the tube 41, see FIG. 12. The second position 88 of the displacement body 50 has now been reached. In the meantime the tip 84 of the displacement body 50 has ruptured the upper cover foil 42 of the cement cartridge 40. Further the displacement body 5 which has entered the cement cartridge 40 has displaced about 40% of the flowable cement amount counter to the forward movement 6 via the backflow channels 81 upwardly. The still flowable cement 8 has, in the process, reached the upper cover plate 101. At the same time with the displacement procedure, the reflux zone 65 has spread open the engagement elements 22 to a certain degree. In the process, the pinnacles 13 have started to bend over toward the front face 12 of the engagement elements 22.

Figure 10:
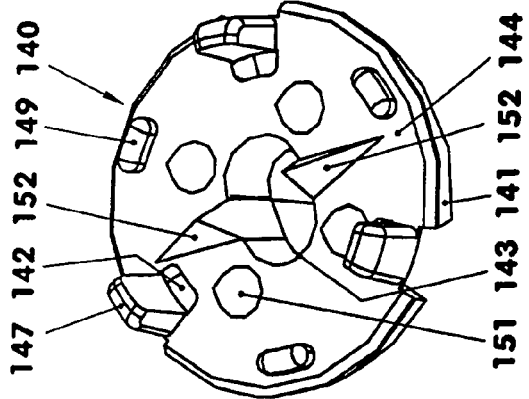
FIG. 10 shows the anchor bottom at a small angle from below.

In a third step, the downwardly moving displacement body 50 biases the tube 41 forcefully against the cylinder bottom 140 so that the stop-like break off pins 147 breakaway at their break-off webs 148, see FIG. 10. The break-off pins 147 drop into the recesses 142. The displacement body 50 has not reached its third position 89. With the breaking of the break-off pins 147, the lower cover foil 43 is pressed onto the sharp-edged prisms 152 and thorns 151 and is ruptured thereby. The tube is now firmly disposed on the support legs 149, see FIG. 13.

With the further forward movement of the displacement body 50, the support projections 74 are yielding. They are sheared off or they slide now along the inner wall of the tube 41 see FIG. 14. In the process a part of the cement material 8 is further displaced upwardly until the upper ends 82 of the return flow channels 81 reach the upper edge of the tube 41. The upper ends 82 of the backflow channels 81 act like control edges of a hydraulic valve. The gap between the tube 41 and the wall of the reflux zone 65 prevents a backflow of the still liquid cement material 8. With the length of the back flow channel 81 in this way, additionally, the cement material volume to be pressed upwardly can be controlled.

Subsequently the remaining volume of the cement material is displaced only via the openings 39, 142, 143 in the lower area of the cylinder body 10, or respectively, the bottom wall 140 in front of the lower cover plate 111.

Figure 15:
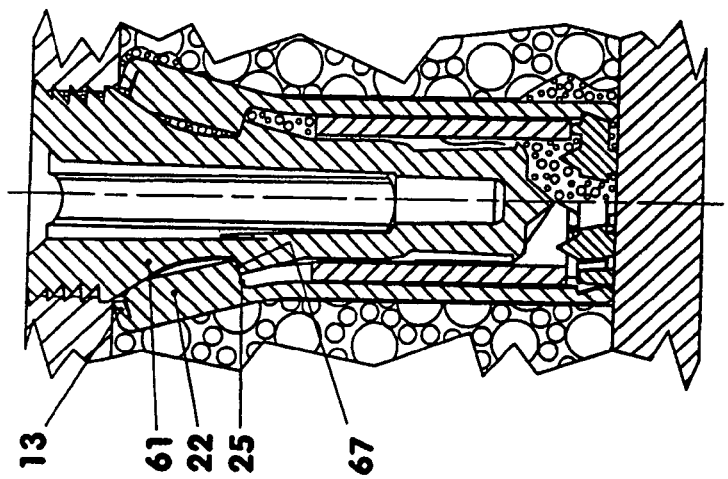
FIG. 15 shows the same as FIG. 14 however with the anchor rotated by 45 angular degrees.
Figure 14:
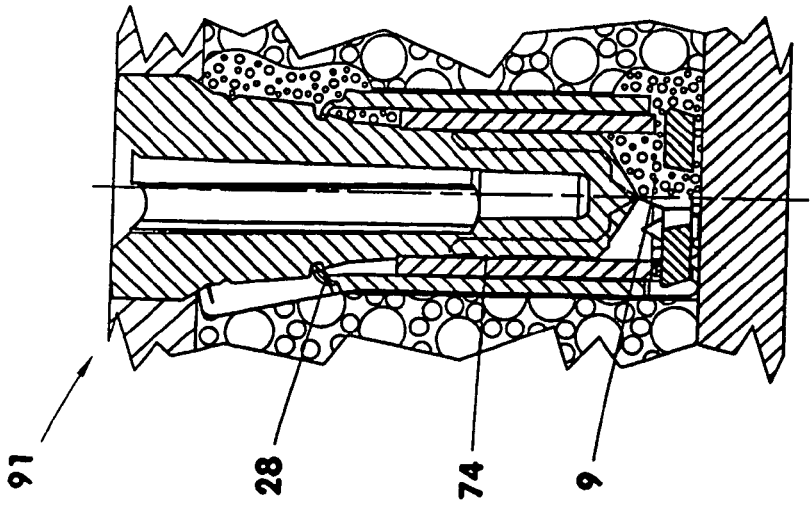
FIG. 14 shows the same as FIG. 13 after a third displacement body insertion step.

The procedure is completed as soon as the displacement body 50 has reached its fourth and last position, see FIGS. 14 and 15. Then the lower part of the displacement body 50, almost completely fills the interior space of the cement material container 40.

As shown in FIG. 15, the engagement elements 22 are fully spread apart by the wedging zone 61. The pinnacles 13 abut fully the front surface 12 and press upwardly from the bottom against the inner surface 103 of the upper cover plate 101. At the same time the engagement surface areas 25 of the engagement elements 22 abut the support surface 67 of the blocking ring 66.

As shown in FIG. 14, the sealing tongues 28 of the cylinder body 10 are disposed below the wedge elements 62 on the support surface 67 and prevent there, among others, a backflow of the cement material 8 into the lower area of the anchor.

During the third step, the clamping zone 52 was pressed into the bore 105. In the process, the circumferentially extending webs 53 were firmly engaged in the lower layers of the cover plate 101 whereas the upper areas of the clamping webs 55 are embedded in the generally harder surface layer of the cover plate 101. The base of the circumferentially extending grooves 54 has a smaller diameter than the bore 105, see FIG. 15. Via the vertical grooves 56, the cement 8 reaches at least partially the three lower circumferentially extending grooves 54, see FIG. 15, so that also the clamping zone 52 is cemented to the upper cover plate 101.

At some time, for example after 60 seconds, the cement is cured.

The upper front face 51 of the clamping zone 52 is disposed in the shown exemplary embodiment in the plane of the outer cover plate surface 102. In process the front face 51 is usually disposed by one to two tenths of a millimeter below the plane mentioned above.

In all the shown cement anchors, the cylinder body 10 may be extended and be accommodated in a dead end bore formed into the lower cover plate 111. See DE 10 2006 049 954 A1.

The opening elements 73, 84, 151, 152 for opening the cement cartridge are pointed plastic parts of the displacement body 50 and of the bottom 140. Of course, they may also be formed by injected or inserted sharp-edged parts such as blades or similar structures.

| | |
|---|---|
| 1 | Closeable opening |
| 2 | Closeable opening |
| 5 | Centerline of the cement anchor |
| 6 | Anchor installation direction |
| 7 | Woods solidifier |
| 8 | Cement, liquid |
| 9 | Cement, solid |
| 10 | Cylinder body |
| 11 | Tubular section |
| 12 | Front face |
| 13 | Pinnacle |
| 14 | Recess |
| 16 | Cavity |
| 17 | Interior space |
| 19 | Grooves |
| 21 | Engagement area |
| 22 | Engagement element |
| 23 | Support surfaces |
| 24 | Channel |
| 25 | Engagement area |
| 27 | Longitudinal slot |
| 28 | Sealing tongues |
| 31 | Second area, cartridge support |
| 32 | Hinge zone |
| 33 | Squared stops |
| 36 | Third area |
| 37 | tongue |
| 38 | Annular recess |
| 39 | Longitudinal slots |
| 40 | Cement cartridge |
| 41 | Cylinder, tube |
| 42 | Cover foil |
| 43 | Cover foil |
| 45 | Intermediate wall |
| 46 | Upper chamber |
| 47 | Lower chamber |
| 48 | Outer wall |
| 49 | Inner wall |
| 50 | Displacement body |
| 51 | Front face |
| 52 | Clamping zone |
| 53 | Circumferentially extending web |
| 54 | Circumferentially extending groove |
| 55 | Clamping web |
| 56 | Vertical groove |
| 59 | Grooves in inner wall |
| 61 | Wedging zone |
| 62 | Wedge elements |
| 63 | Surface area |
| 64 | Groove |
| 65 | Reflex zone |
| 66 | Blocking ring |
| 67 | Support surface |
| 68 | cut-out |
| 71 | Cylindrical section |
| 72 | Rotation preventing webs |
| 73 | Tips, cutting edge-like |
| 74 | Support projection |
| 75 | Holding zone |
| 76 | Holding surface area |
| 77 | Blocking areas |
| 78 | Support projection |
| 81 | Return flow channel |
| 82 | End of return flow channel |
| 83 | Lower front face |
| 84 | Pyramidal tip |
| 85 | Central opening |
| 86 | Radial webs |
| 87 | First position |
| 88 | Second position |
| 89 | Third position |
| 91 | Fourth position |
| 100 | Lightweight construction panel |
| 101 | Upper cover plate |
| 102 | Outer surface |
| 103 | Inner surface |
| 105 | Bore section |
| 111 | Lower cover plate |
| 113 | Inner surface |
| 121 | Support core |
| 125 | Bore section |
| 130 | Bore |

-continued

| | |
|---|---|
| 140 | Bottom |
| 141 | Outer wall |
| 142 | Recesses |
| 143 | Oval opening |
| 144 | Upper side |
| 147 | Break off pin |
| 148 | Break off web |
| 149 | Support legs |
| 151 | Pointed thorns |
| 152 | Sharp-edged prism |
| 155 | Bottom side |
| 156 | legs |

What is claimed is:

1. An anchor for use in a lightweight construction panel (100) having an upper cover plate (101) and a lower cover plate (111) with a support core (121) disposed therebetween, said anchor comprising a cylinder body (10) having a bottom (140), a displacement body (50) and a cement container (40) disposed in the cylinder body (10) and provided with predetermined rupture areas, the cylinder body (10) having at least two engagement elements (22) which, after insertion of the anchor into a bore formed in the lightweight construction panel (100) and upon insertion of the displacement body (50) into the cylinder body (10), are spread apart below the upper cover plate (101), the cylinder body (10) having an inner chamber accommodating the cement container (40) and being provided with several openings (16, 39, 142, 143) and the cement container (40) having at least two chambers (46, 47), an upper opening (1), a lower opening (2) and a rupturable intermediate separating wall (44) consisting of the same material as the cement container (40), the upper and the lower openings (1, 2) being closed each by a rupturable aluminum foil (42, 43).

2. The anchor according to claim 1, wherein the cement container (40) is an at least approximately cylindrical tube (41) which is closed at its opposite front ends by the rupturable aluminum foil (42, 43) which are gas and liquid tight.

3. The anchor according to claim 2, wherein the gas and liquid-tight aluminum foils (42, 43) and the intermediate wall (44) have a rupture strength of less than 10 N/mm$^2$.

4. The anchor according to claim 1, wherein the intermediate wall (44) extends parallel to the rupturable aluminum foils (42, 43).

5. The anchor according to claim 1, wherein the cylinder body (10) consists of a tube section (11) provided with a bottom (140).

6. The anchor according to claim 1, wherein the cylinder body (10) includes upper stops (33) and lower pins (147) and the cement container (40) of the anchor is positioned in the interior (1.7) of the cylinder body (10) between the upper stops 33) and the pins (147).

7. The anchor according to claim 1, wherein—before insertion—the displacement body (50) is disposed above the cement container (40) in the cylinder body (10) in a force-form or material locked position.

8. The anchor according to claim 1, wherein the displacement body (50) is provided at its lower front face (83) with opening elements (73, 84) which are oriented toward the upper rupturable aluminum foil (42) of the cement container (40).

9. The anchor according to claim 1, wherein, with the anchor disposed in a lightweight construction panel, the upper face (51) of the displacement body (50) is disposed at least approximately aligned with the outer surface (102) of the upper cover plate (101).

10. The anchor according to claim 1, wherein the cement container (40) is filled with a single-component moisture hardening reaction cement on a polyurethane basis.

\* \* \* \* \*